United States Patent Office 3,296,336
Patented Jan. 3, 1967

3,296,336
UNSATURATED POLYESTER RESINS DERIVED FROM COMPLEX ETHER ALCOHOLS, COMPOSITIONS CONTAINING SAME, AND PROCESS FOR PRODUCING THE COMPOSITION
Friedrich Engelhardt, Homberg, Lower Rhine, Germany, assignor to Rheinpreussen Aktiengesellschaft für Bergbau und Chemie, Homberg, Lower Rhine, Germany, a corporation of Germany
No Drawing. Filed Oct. 22, 1962, Ser. No. 232,295
Claims priority, application Germany, July 7, 1958, R 23,630
8 Claims. (Cl. 260—861)

This application is a continuation-in-part of copending application Serial No. 825,386, filed July 2, 1959, now abandoned.

This invention relates to new and useful improvements in the production of resinous condensation products. More particularly, this invention relates to the preparation of hardenable esters from polyhydric alcohols, saturated dicarboxylic acids and unsaturated ether alcohols which have only one hydroxyl group.

Polyester resins, which have their double bonds in the form of unsaturated ether groups, are known. Such resins can, for example, be formed by the reaction of a glycerine-monoallyl-ether with a saturated dicarboxylic acid. In addition to the glycerinemonoallylether, mono- or poly-ethers of other polyhydric alcohols, which contain at least two free hydroxyl groups, have been used in the esterification reaction producing the known polyesters.

The unsaturated polyesters thus produced are substantially similar to the linear polyesters which are formed by the reaction of a polyhydric alcohol with a polybasic acid and possess substantially all of their disadvantages. Thus, for instance, when resins of this type are further treated to modify their properties, as for example, co-polymerization of the unsaturated polyesters with vinyl or allyl compounds, non-sticky mixed polymers can only be produced when the process is carried out with the complete exclusion of air. More particularly, the production of a thin film is thus rendered difficult, so that the use of the unsaturated polyesters as varnishing or lacquer resins is impeded to a very large extent. It appears that the presence of atmospheric oxygen inhibits the mixed polymerization on the outer surface.

While it is known that these difficulties can be largely removed by the addition of small amounts of paraffin or wax, which rise to the surface during the polymerization process, this method involves the substantial disadvantage that these additives, which render the film dull, have later to be laboriously removed. There is also the risk that small amounts of such additives will be retained in the

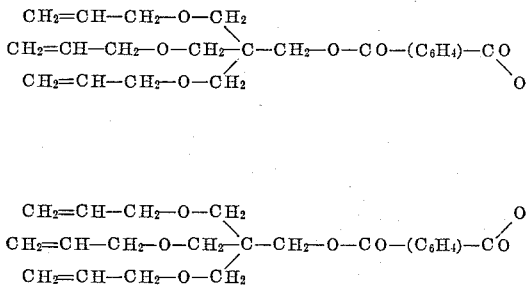

resin, with a resultant detrimental effect on the properties thereof.

Moreover, in thermosetting or heat-hardening, the effect achieved by the addition of paraffin or wax can in practice not be attained.

Attempts have also been made to produce non-sticky or non-tacky mixed polymers from unsaturated polyesters and vinyl or allyl compounds by using determined starting materials. Thus, it is known to react unsaturated dicarboxylic acids with polycyclic, polyhydric alcohols, in which the hydroxyl groups are distributed over various rings of a condensed ring system. The esters produced in this manner are, however, relatively brittle, which is obviously detrimental to their use as varnishing or lacquer resins. Moreover, complete non-stickiness or absence of tackiness can only be achieved if these alcohols are used unmixed with other alcohols, or if relatively large amounts of the alcohols are admixed with other alcohols. Additionally, the polyesters have a strong tendency to gel during their preparation.

It has furthermore been proposed to obtain a so-called air-drying of these materials with the use of certain acids and alcohols, such as endomethylene tetrahydrophthalic acid or polycyclic polyvalent alcohols. While films produced in this manner will air-dry, the same have a relatively soft surface which will not, for example, permit dry grinding.

An object of the invention is to provide for the formation of novel resins. Another object is to provide resin-forming compounds and resins having new and valuable properties. Still another object of this invention is the combination of the resinous condensation products with unsaturated polyesters, the latter may be co-polymerized with vinyl or allyl monomers without the above-mentioned difficulties. Other objects will be apparent from the description given hereinafter.

Quite unexpectedly, it has now been found that resinous condensation products of greatly improved air-drying properties can be produced by reacting the saturated dicarboxylic acids with polyhydric, at least trihydric alcohols and thereafter esterifying the free carboxyl groups of the semi-esterified dicarboxylic acids formed with unsaturated ether alcohols which contain only one hydroxyl group. These resins are derived from three reactants, i.e. they are formed fom the polyhydric alcohol, the saturated dicarboxylic acid, and unsaturated ether alcohols. They are to be distinguished from resins of four reactants which include for example coconut oil acid or glyceride in addition to the three reactants of the resin of the invention. The four reactant resins are oil modified resins and such resins are disclosed in Hoover Patent 2,606,883, issued August 12, 1952.

The esterification product obtained in accordance with the invention has a chemical architecture, which differs basically from any of the known alkyd resins, as can be seen from the formula below for the resinous condensation product derived from pentaerythrite, phthalic acid anhydride and the triallylether of pentaerythrite:

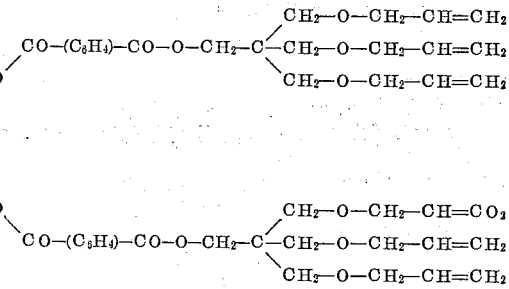

The foregoing esterification product, as can be seen from its structural picture, is a highly branched, uniformly arranged molecule, which in the one molecule contains 12 effective allylether groups which are directly responsible for its abilities to harden when exposed to air.

In the carrying out of the invention, the novel resinous condensation products are formed by condensation processes, effected substantially in the known manner by suitably heating the components together. The esterification may also be effected azeotropically, as for example in the presence of xylene, in order to effect thereby a quick removal of the water formed in the condensation reaction. In carrying out the invention, the novel resin may be formed by heating a mixture of the polyhydric alcohol with the saturated dicarboxylic acid to thereby form the half-ester. It is of particular advantage to use the dicarboxylic acids in the form of their anhydrides, as then the half-ester formation is very smoothly effected under mild conditions without any undesirable polycondensation at temperatures of 90–130° C. Thereafter, the free carboxyl groups of the resultant half-esters are esterified with the free hydroxyl group of the unsaturated ether alcohols at higher temperatures of 180–250° C. Or, alternately, the dicarboxylic acid can be reacted with the unsaturated ether alcohol, and the free carboxyl groups of the dicarboxylic acid half-ester thereby formed can be esterified with the hydroxyl groups of the polyalcohols. It is also possible to effect the desired esterification by heating together all of the starting materials, whereby, as is already known, with the use of dicarboxylic acid anhydrides the formation of half-esters takes place smoothly in the heat-up phase, and thus, any polycondensation is avoided. Where the three reactants are heated together the half-ester formation can take place at a temperature of 90–130° C., and the esterification can be completed at 180–250° C.

A useful method of bringing about the reaction consists in heating the reactants together in a closed reaction vessel equipped with an efficient stirring mechanism and provided with means to permit the continuous removal of water. The reaction mixture is provided with a blanket of an inert gas, such as nitrogen or carbon dioxide. The reaction can be conducted at atmospheric, reduced or superatmospheric pressures. Continuous as well as discontinuous processes can be used. If desired, there may be provided inert organic solvents or other diluents for the reactants or products. Suggested solvents are benzene, toluene, xylene, chloroform, carbon tetrachloride, ethylene dichloride, propylene dichloride, ethylene trichloride, propylene trichloride, the butylene chlorides, etc.

The proportions, in which the reacting materials are employed, can be varied within wide limits. The proportions of the reactants are adjusted in such a way that for each carboxyl group there is provided at least one hydroxyl group. The ratio of alcoholic reactants to acid reactants, however, can under certain conditions be adjusted so that there may be present an excess of hydroxyl groups. It is preferable to adjust the quantities of the starting materials so that the hydroxyl groups are present in an excess of 5–10% with respect to the carboxyl groups. It is usually preferable to use the polyhydric alcohol in excess. A suggested mixture is, for example, 1 mol pentaerythrite, 3.5 mols phthalic acid anhydride and 3.5 mols trimethylolisopropanoltriallylether.

The polyhydric alcohols, which can be used in forming the resins of the invention, include glycerine, trimethylolethane, trimethylolpropane, 3,3-dimethylobutanol - 2, hexanetriol, pentaerythrite, 1,1-trimethylolisopropanol, tetramethylolcyclohexanol, mannitol, and sorbitol. Best results can be obtained with polyhydric, saturated alcohols having at least 3 hydroxyl groups and which are aliphatic alcohols containing from about 3 to 10 carbon atoms.

The saturated dicarboxylic acids, with which the polyhydric alcohols are reacted, include, for example phthalic acid, terephthalic acid, succinic acid, adipic acid and sebacic acid. Acid-acting compounds, such as the acid anhydrides, can be used in place of the acids themselves, and in some cases such compounds are preferred. For instance, phthalic anhydride is nearly always preferred to phthalic acid. The acids can contain from about 4 to 10 carbon atoms.

Unsaturated ether alcohols having one hydroxyl group are used. According to the invention, there can be particularly mentioned ethers of polyalcohols with alcohols of the allyl type. Suitable polyalcohols, in this connection, are alcohols containing from 3 to 10 carbon atoms. Suitable alcohols are for instance glycerine, trimethylolpropane, 3,3-dimethylol-butanol-2, pentaerythrite, and trimethylolisopropanol. Examples of alcohols of the allyl type are such alcohols containing from about 3 to 12 carbon atoms. Such alcohols are allyl-, methallyl-, chlorallyl-, ethallyl-, cyclohexylallyl-alcohol, as well as crotyl alcohol, and cinnamic alcohol. Thus there can be used glycerine diallylether, trimethylolpropanediallylether, 3,3-dimethylol-butanol-2-diallylether, pentaerythritetriallylether, trimethylolisopropanoltriallylether and tetramethylolcyclohexanoltetraallylether or the corresponding methallylethers. The unsaturated ether alcohols of polyalcohols with crotyl-, chlorocrotyl-, 2-dodecenyl-, 2-isohexenyl- and 2-pentenyl-alcohol can also be satisfactorily used. The unsaturated ether alcohols used according to the invention have only one hydroxy group and at least two $\beta,\gamma$ carbon-to-carbon double bonds, that is, at least two carbon-to-carbon double bonds which are $\beta,\gamma$ to the ether oxygen.

In each instance, the starting materials may be used in admixture with each other. Instead of a single acid, mixtures of two or more acids or acid-acting compounds or mixtures of polyalcohols can be used. Thus, the dicarboxylic acid component can, for instance, consist of phthalic acid and succinic acid, and as polyalcohol can be used pentaerythrite and glycerine. It is also possible to use both combinations jointly. Furthermore, the unsaturated ether alcohols may be partially substituted by saturated ether alcohols, as for instance by glycerinedibenzylether, pentaerythritetribenzylether or glycolmonoethylether, or the unsaturated ether alcohols may be partially substituted by other monohydric alcohols, such as for example cyclohexanol, octylalcohol, monylalcohol or benzylalcohol. The aforesaid variations serve to modify in any of the variety of ways the characteristics of the esterification products obtained in accordance with the invention. It will of course be understood that whereas the resins are formed from three reactants, namely: polyhydric alcohol, saturated dicarboxylic acid, and the unsaturated ether alcohol, several of the polyhydric alcohols, several of the acids, and several of the ethers can be used to make a composition of the invention.

The esterification products of the invention are highly viscous to solid, water-clear transparent resins. The resinous products are soluble in the customary lacquer solving agents and particularly in benzene-hydrocarbons, alcohols and ketones and mixtures thereof. They are insoluble in water.

The resinous materials according to the invention may be mixed with a filler, said fillers being preferably of the fibrous type, such as cellulose, asbestos or glass fibers, but asbestine, talcum, basite, slate flour, iron mica or kaolin are also suitable. Plasticizers, dyes, pigments may also be incorporated as desired. As a result of the smooth and gentle course of the reaction during their production, the light or clear resinous condensation products of the invention harden to form glass clear, surface-hard, scratch-resistant films. The said resinous condensation products are distinguished by their high drying speed and the thoroughness with which the drying is accomplished.

The resinous esterfication products of the invention form particularly advantageous products when combined with polymerizable mixtures of unsaturated polyesters and polymerizable vinyl or allyl compounds. When the resinous materials of the invention are combined with unsaturated polyesters, an infinite variation in the ratios of the components may be employed. This is an advantage not possible with any of the known air-drying resin systems, as for example with the alkyd resins.

The resinous condensation products of the invention in admixture with vinyl monomers (i.e. vinyl or allyl compounds, such as styrene, methacrylates, vinyl acetate, methylstyrene, vinylchloride, vinylidene chloride, etc.) and unsaturated polyesters can be hardened at room temperature as well as at an elevated temperature with the aid of the known peroxides and siccatives or driers used as catalysts or accelerators. Preferably, the resinous condensation product is mixed with the unsaturated polyester and the combination is dissolved in the polymerizable vinyl monomer. The resulting solution is then subjected to a combined hardening reaction by simultaneous air-drying and copolymerization in the presence of a conventional polymerization catalyst, such as a peroxide, and an accelerator such as an amine, sulfinic acid or metal salt of mixtures thereof. The hardening may be effected at room temperature, but also at elevated temperatures up to 160° C. As catalysts may be used benzoyl peroxide, lauroyl peroxide, methyl ethyl ketone peroxide, dicyclohexyl peroxide or cumol peroxide in combination with cobalt octoate or cobalt naphthenate or the corresponding lead or manganese salts as accelerators. The cobalt, lead or manganese salts of other higher molecular acids such as stearic or palmitic acid, may also be used as accelerators. In general, the addition of 10–20 percent by weight of the resins according to the invention in relation to the used mixture of unsaturated polyester and vinyl monomer is sufficient to reach the desired drying effect.

In addition to the uses already mentioned, the resins of the invention are suitable for the preparation of varnishes, baking enamels, paints, adhesives, impregnating compositions, casting resins, priming material, etc.

The following examples are given for the purpose of illustrating the invention. Parts are on the basis of weight.

*Example 1*

136 parts by weight of pentaerythrite were esterified with 489 parts by weight of phthalic acid anhydride. The esterification was effected at a temperature of 110° C., while passing through a stream of nitrogen. After about one hour, an acid number of about 300 was reached, which approximately corresponds to half-ester formation. There was then added to the reaction mixture 891 parts by weight of trimethylolisopropanoltriallylether, and esterification was effected at 200° C. until an acid number of less than 30 was reached, whereby practically the whole theoretical amount of water was removed. The condition was reached after about 10 hours. After cooling there was obtained a water-clear, highly viscous resin.

50 parts by weight of the resin thus obtained were dissolved in 35 parts of a xylene/butyl-acetate mixture (7:3). To this solution there was added 0.2 part by weight of lead and 0.02 part by weight of cobalt in the form of lead or cobalt naphthenate, respectively. A film of this mixture on glass of 100/μ thickness is dust-dry after 4 hours, and after about 20 hours thoroughly hardened. It shows after this time a pendulum hardness of 60, has very good gloss and an excellent adhesiveness.

*Example 2*

136 parts by weight of pentaerythrite, 444 parts by weight of phthalic acid anhydride, 30 parts by weight of succinic acid anhydride and 705 parts by weight of 3,3-dimethylolbutanol-2-diallyl-ether were esterified for about an hour at 110–120° C. and subsequently further esterified at 200° C., until an acid number of about 40 was reached. The product obtained was a light, viscous resin.

40 parts by weight of this resin were dissolved in 160 parts by weight of an unsaturated polyester. The unsaturated polyester was obtained from 1.4 mol maleic acid anhydride, 0.6 mol phthalic acid anhydride and 2.2 mols propyleneglycol and was admixed in a ratio of 3:2 with styrene.

A part of this clear and light-colored solution was reacted with 1% methylethylketoneperoxide (50%) and 3% of an 11% solution of cobalt naphthenate in styrene and after further dilution with styrene applied as film on glass or wood. After about 3 hours (at room temperature) the film was dust-dry, and after about 15 hours it was thoroughly hardened to a highly glossy lacquer film.

*Example 3*

150 parts by weight of trimethylolisopropanol, 67 parts by weight of 3,3-dimethylolbutanol-2, 727 parts by weight of phthalic acid anhydride and 1255 parts by weight of pentaerythritetriallyether were esterified, as described in Example 1. After about 10 hours, a final acid number of 30 was reached. There was obtained a water-clear resin of highly viscous nature.

A mixture of 100 parts by weight of this resin, 300 parts by weight of an unsaturated polyester which has been prepared from 1 mol maleic acid anhydride, 1 mol phthalic acid anhydride and 2.1 mols 2-methyl-butandiol-1,3, 400 parts by weight of styrene, 8 parts by weight of dicyclohexylperoxide (50%—as paste) and 24 parts by weight of an 11% cobalt octoate solution in styrene was sprayed with a spray gun onto wood. The lacquer (at room temperature, after 4–5 hours) dried to form a film completely free from tackiness and had thoroughly hardened after 15 hours. The film was distinguished by its excellent glossiness as well as its good elasticity and hardness. It was water-proof, completely resistant to gasoline, practically insensitive to benzenes and could be ground and polished.

What is claimed is:

1. A resin composition comprising a mixture of a resin consisting of condensation reaction product of a polyhydric alcohol containing about 3–10 hydroxyl groups, a saturated dicarboxylic acid and an unsaturated ether alcohol having only one hydroxyl group and at least two monoolefinic groups bonded respectively to two ether oxygen, with an unsaturated polyester of an unsaturated dicarboxylic acid and a polyhydric alcohol, and a vinylmonomer selected from the group consisting of styrene, methacrylic acid esters, vinyl-acetate, methylstyrene, vinylchloride, and vinylidenechloride, said resin composition being hardenable by simultaneous air-drying and copolymerization.

2. A resin consisting of a condensation reaction product of 1 mol of pentaerythrite, 3.5 mols of phthalic acid anhydride, and 3.5 mols of trimethylolisopropanoltriallylether.

3. A resin consisting of a condensation reaction product of pentaerythrite, phthalic anhydride and trimethylolisopropanoltriallylether.

4. A resin consisting of a condensation reaction product of pentaerythrite, phthalic anhydride and 3,3-dimethylol-butanol-2-diallylether.

5. A resin consisting of a condensation reaction product of trimethylolisopropanol, 3,3-dimethylol-butanol-2, phthalic anhydride and pentaerythrite triallylether.

6. Process for the production of a resinous composition, which comprises admixing a condensation reaction product consisting of the condensation product of a polyhydric alcohol containing at least three hydroxyl groups, a saturated dicarboxylic acid and an unsaturated ether alcohol having only one hydroxyl group and at least two monoolefinic groups bonded respectively to two ether oxygen, with an unsaturated polyester obtained by reaction of an unsaturated dicarboxylic acid and a polyhydric alcohol, and a vinylmonomer selected from the group consisting of styrene, methacrylic acid esters, vinylacetate, methylstyrene, vinylchloride, and vinylidene chloride, and hardening this mixture at temperatures up to 160° C. to produce a resinous composition.

7. Process according to claim 6, in which said condensation product of said polyhydric alcohol, said saturated dicarboxylic acid and said unsaturated ether alcohol is admixed with said unsaturated polyester, the resulting mixture dissolved in said vinylmonomer.

8. Process according to claim 6, in which said vinylmonomer is styrene.

References Cited by the Examiner

UNITED STATES PATENTS

| | | | |
|---|---|---|---|
| 2,280,242 | 4/1942 | Kropa | 260—77 |
| 2,606,883 | 8/1952 | Hoover | 260—77 |
| 2,852,487 | 9/1958 | Maker | 260—861 |

OTHER REFERENCES

Payne, H. F.: Organic Coating Technology, vol. 1, John Wiley and Sons, Inc., 1954, pp. 277–299.

MURRAY TILLMAN, *Primary Examiner.*

J. T. GOOLKASIAN, *Assistant Examiner.*